Dec. 11, 1928.
A. P. CROSBY
1,694,641
RADIATOR RETURN TRAP
Filed May 2, 1927
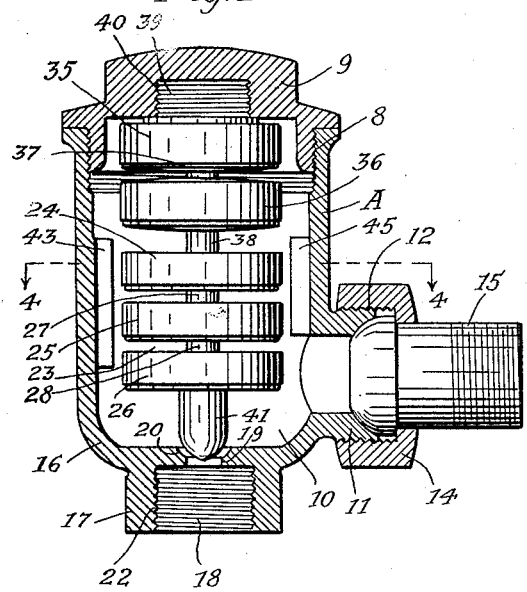
Inventor
Arthur P. Crosby.
By Bradbury + Cauwell
Attorneys Patented Dec. 11, 1928.

1,694,641

UNITED STATES PATENT OFFICE.

ARTHUR P. CROSBY, OF MINNEAPOLIS, MINNESOTA, ASSIGNOR OF ONE-HALF TO WILLIAM T. PRICE, OF MINNEAPOLIS, MINNESOTA.

RADIATOR RETURN TRAP.

Application filed May 2, 1927. Serial No. 188,192.

My invention relates to radiator return traps and particularly to the types of traps employing a fluid actuated thermoresponsive expansible element, and has for an object thereof to provide a resilient support for carrying the thermoresponsive element adapted to yield upon excessive expansion thereof due to abnormal temperatures within the trap so as to prevent injury to the valve mechanism and to said thermoresponsive element.

Another object of the invention resides in providing a housing formed with an inlet and an outlet and a valve for closing said outlet, said housing having a removable cap, and in attaching said resilient support directly to said cap, said thermoresponsive element being carried by said resilient support and having rigidly secured to it said valve, said valve being adapted to close said outlet upon expansion of said thermoresponsive element and said resilient member being adapted to yield upon excessive expansion of said thermoresponsive element.

Another object of the invention resides in forming said resilient member of one or more expansible resilient cells having compartments formed by means of spaced diaphragms connected along their peripheral edges, said cells being filled with air and serving to yield, under axial pressure against said diaphragms, to prevent injury to said thermoresponsive element upon excessive expansion thereof.

With the foregoing and other objects in view, which will appear in the following description, the invention resides in the novel combination and arrangement of parts and in the details of construction hereinafter described and claimed.

In the drawings:

Fig. 1 is a longitudinal sectional view of a trap illustrating an embodiment of my invention with the valve thereof opened.

Fig. 2 is a view similar to Fig. 1 showing the valve mechanism closed.

Fig. 3 is a view similar to Fig. 2 illustrating the valve member closed and the resilient member in yielded position, said resilient member being shown in section.

Fig. 4 is a transverse sectional view taken on the line 4—4 of Fig. 1.

In the various steam heating systems employing traps utilizing thermoresponsive elements operating against fixed abutments for the purpose of closing the valve mechanism within the traps, injury frequently occurs due to excessive expansion of the valve member. Where springs or similar structures are used to form a yielding abutment for the valves, the valves frequently fail to seat in the proper position, and breakage and the loss of resiliency of the springs cause considerable difficulty and uncertainty in operation. My invention overcomes these disadvantages and prevents injury to the thermoresponsive elements by providing a resilient support formed of the same construction as the thermoresponsive element and being filled with air instead of the usual expansible fluid, said air filled cells serving as resilient members for directly supporting the thermoresponsive element and serving to yield upon excessive expansion thereof.

The embodiment of my invention illustrated in the drawings comprises a housing A of cylindrical formation open at the top and threaded at 8 to receive a cap or closure 9 to form a chamber 10 within the same. At one side of the housing A is formed a neck 11 providing an inlet into chamber 10 of said housing, which neck is externally threaded at 12 to receive a clamp nut 14 by means of which the entire trap may be rigidly mounted upon the usual nipple 15 of the ordinary radiator on which the trap is to be used. Depending from the lower wall 16 of the housing A is a neck 17 having an outlet 18 communicating with the chamber 10 of housing A. This neck is constricted at its juncture with the housing A as indicated at 19, being formed with a valve seat 20 adapted to receive a valve closure to be presently described for the purpose of closing the opening from chamber 10 to the outlet 18. The interior of the neck 17 is threaded at 22 to receive a pipe, not shown, by means of which the water entering the trap may be conducted away.

Within the interior of housing A is supported a thermoresponsive fluid actuated expansible element 23. This device consists of three cells 24, 25 and 26 connected together by means of two nipples 27 and 28. Each of the cells 24, 25 and 26 consists of two diaphragms 29 and 30 having overlapping peripheral flanges 31 and 32 arranged to be soldered together to form a chamber 33 within the element and adapted to be enlarged or reduced in volume by the movement of the central portions of the diaphragms 29 and 30 toward or from one another. The nipples 27 and 28, soldered to the respective diaphragms 29 and 30, bring the cells 24, 25 and 26 into communication with each other.

The thermoresponsive element 23 is supported by means of a resilient member 34 consisting of two cells 35 and 36 constructed like the cells 24, 25 and 26. These cells consist of diaphragms 29 and 30, the same as cells 24, 25 and 26 and are connected by means of a nipple 37 bringing the two chambers into intercommunication. The thermoresponsive element 23 is attached to the resilient member 34 by means of a stud 38, which may be riveted to the respective diaphragms 29 and 30 of the respective cells 24 and 36, the stud connecting the thermoresponsive element to the resilient member. The assemblage of cells is carried by a plug 39 of relatively large diameter which is riveted to the diaphragm 29 of cell 35 and adapted to be screwed into the head of cap 9, which is threaded at 40 to receive the same. Protruding from the center of the lower diaphragm of element 26 is a valve head 41 which is normally disposed in axial alignment with the valve seat 20, the said valve head being adapted to seat against the seat 20, upon expansion of the thermoresponsive element 24, and close the passageway between the chamber 10 and the outlet 18.

While the assemblage of cells is normally held by the plug 39 disposed substantially axially of the casing A and valve seat 20, it remains that the cell assembly might be sprung out of position in handling or in shipment or that it might become buckled under expansion or contraction due to non-uniformity in the action of the cells. Such springing or buckling of the cell assembly is prevented by the use of a number of ribs 42, 43, 44 and 45 formed internally of the housing A and extending longitudinally thereof. With the cell assembly in true axial relation with respect to the housing A and valve seat 20, the inner edges of said ribs slightly clear the peripheries of cells 24, 25 and 26, said ribs, however, serving to prevent any substantial lateral displacement of the cell assembly without impeding the action of said assembly.

Cell 26 of the thermoresponsive element is supplied with some suitable fluid adapted to become volatilized upon increase of the temperature within the chamber 10, the vapor from said fluid serving, under increasing temperatures, to expand and elongate the thermoresponsive element 23 and thereby close the valve 41. The relative arrangement of the parts when the valve 41 is closed is shown in Fig. 2.

The chambers 33 within the cells 35 and 36 are preferably filled with air or some other suitable gas adapted to expand but slightly over considerable changes in temperature. This gas together with the resiliency of the material forming the cells 35 and 36 converts these two cells into a resilient member adapted to be compressed upon the exertion of pressure against the same. In the normal operation of the valve, these cells are practically immovable serving as an abutment and support for the thermoresponsive element 23, which, when expanded, closes the valve 41. Upon excessive expansion of the thermoresponsive element 23 due to abnormal temperatures within the chamber 10, the diaphragms 29 and 30 of the cells 35 and 36 are caused to approach one another as indicated in Fig. 3, whereby the abutment, against which the thermoresponsive element 23 reacts in the closing of the valve 41, becomes yieldable, thereby preventing injury to the said element when excessive expansion thereof occurs. In this manner the thermoresponsive element is protected from breakage and the consequential disadvantages arising from failure of the trap to function properly is prevented.

With the expansible element 23 fully contracted, valve 41 occupies position removed from seat 20 a distance greater than the maximum expansible distance of one cell of said element. It, therefore, will become apparent that the two cells of member 34 can readily accommodate any elongation of the three cell element 23, after the valve 41 has become seated, since less than the maximum expansion of two of said three cells remains at the beginning of compression of the two cells of said resilient member 34. The diaphragms comprising the cells of the resilient member 34 and expansible element 23 are "set" after being roughly formed, so that the paired diaphragms in member 34 are normally bowed away from each other and the paired diaphragms in element 23 are normally bowed toward each other. This relative arrangement of diaphragms provides for ample elongation of the element 23 and ample compression of member 34 with a minimum number of cells in each instance, whereby the device as a whole may be kept within conventional dimensional limits.

The advantages of my invention are manifest. An extremely effective device is produced, which completely prevents the breaking of or injury to the thermoresponsive element in the presence of excessive temperature within the trap chamber. A unitary structure is provided for supporting the valve and the thermoresponsive element, said structure being removable as a unit from the housing upon the unscrewing of the cap thereof. The resilient member is constructed of the same material and in the same form as the thermoresponsive element so that the same dies and tools may be used for the construction of both the resilient member and the expansible element. Loose spiral springs or similar expedients for the holding of the thermo-responsive element in proper position are dispensed with in my invention, thereby greatly simplifying the construction and improving the operation thereof.

Changes in the specific form of my invention, as herein disclosed, may be made within the scope of what is claimed without departing from the spirit of my invention.

Having described my invention, what I claim as new and desire to protect by Letters Patent is:

1. The combination with a trap casing having a passage therethrough and a removable cap opposite said passage, of an assembly of axially expansible and contractible cells co-axially connected, a valve carried at one end of the assembly adapted to close said passage, and means at the other end of said assembly for securing the same to said cap, certain of said cells containing a medium adapted to cause the same to expand under increasing temperatures and move said valve to close said passage through the consequent elongation of said assembly, other of said cells being adapted yieldingly to contract under the expanding force of said first cells after the valve becomes seated.

2. The combination with a trap casing having a passage therethrough and a removable cap opposite said passage, of an assembly of axially expansible and contractible cells co-axially connected, a valve carried at one end of the assembly adapted to close said passage, and means at the other end of said assembly for detachably securing the same to said cap, certain of said cells containing a medium adapted to cause the same to expand under increasing temperatures and move said valve to close said passage through the consequent elongation of said assembly, other of said cells being adapted yieldingly to contract under the expanding force of said first cells after the valve becomes seated.

3. The combination with a return trap casing and a valve movable against and away from a seat in said casing, of an actuator backed against the casing and adapted to move said valve against said seat, said actuator comprising a series of axially expansible and contractible cells co-axially connected, a group of cells at one end of the series being in intercommunication and a group of said cells at the other end of the series being in intercommunication, the cells of one group containing a medium adapted to cause them to expand under increasing temperatures and thereby cause the closing of the valve on said seat, the cells of the other group containing a medium permitting the same to contract yieldingly after the valve becomes seated.

4. The combination with a return trap casing formed with an opening therein surrounded by a valve seat, of a unit designed to be positioned in said casing and comprising an assembly of axially expansible and contractible cells co-axially connected in series, a valve carried at one end of the assembly, and means at the other end of said assembly for attaching the same to the casing at a position opposite said valve seat, certain of said cells containing a medium adapted to cause the same to expand under increasing temperatures and thereby, through said assembly effect the movement of the valve toward said seat, others of said cells being adapted yieldingly to contract under the expanding force of said first cells after the valve becomes seated.

5. The combination with a return trap casing and a valve movable against and away from a seat in said casing, of an actuator for said valve comprising an assembly of axially expansible and contractible cells co-axially connected in series and adapted to be interposed lengthwise between said casing and valve, certain of said cells containing a medium adapted to cause the same to expand under increasing temperatures and thereby effect the closure of the valve through said cell assembly, other of said cells being adapted yieldingly to contract under the expanding force of said first cells after the valve becomes seated.

6. In combination, a trap casing having a passage therein surrounded by a seat and also having a removable cap opposite said passage, an assembly of axially expansible and contractible cells co-axially connected, a valve carried at one end of the assembly adapted to co-act with said seat to close said passage, the other end of the assembly being backed against said cap, said casing being formed with a plurality of internal ribs extending longitudinally of said assembly, said ribs serving to keep said cells in substantial axial alignment with each other and with said passage, certain of said cells containing a medium adapted to cause the expansion under increasing temperatures within the casing, other of said cells being adapted yieldingly to contract under the expanding force of said first cells after the valve has become seated.

7. In a trap, a casing having passage therein surrounded by a seat, a valve adapted to be closed upon said seat, means for moving said valve against and away from said seat, said means including an assembly of cells, each comprising opposed diaphragms, said cells being axially expansible and contractible and co-axially connected in series, means for connecting said assembly at one end thereof to the casing, certain of said cells containing a medium adapted to cause the expansion of their diaphragms under increasing temperatures within the casing, the diaphragms in each of said cells being normally bowed toward one another, certain other of the cells of said assembly having the respective diaphragms thereof normally bowed away from each other, said cells being adapted to be yieldingly contracted under the force of said first cells after the valve has become seated.

8. In a trap, a casing having a passage therein surrounded by a valve seat, a valve adapted to be closed upon said seat, means for actuating said valve, said means including a thermoresponsive cell having opposed diaphragms normally bowed toward one another, also an abutment cell against which said first cell re-acts, said latter cell having opposed diaphragms normally bowed away from each other.

9. In a trap, a casing having a passage therein surrounded by a valve seat, a valve adapted to be moved from a given position apart from said seat to position against the same, means for moving said valve against said seat, said means comprising a train of expansible temperature responsive cells, a second train of contractible cells aligned with said first train and providing a yielding abutment therefor, the combined contractible extent of said second cells plus the extent of movement of said valve from said given position to position against said seat being greater than the combined expansible extent of said first cells.

In testimony whereof I have affixed my signature to this specification.

ARTHUR P. CROSBY.